No. 649,593. Patented May 15, 1900.
C. E. BLACK.
NURSING NIPPLE.
(Application filed July 1, 1898.)

(No Model.)

WITNESSES,
Irw L. Fish
R. A. Bates

INVENTOR
Charles E. Black,
BY Wilmarth H. Thurston
ATT'Y.

UNITED STATES PATENT OFFICE.

CHARLES E. BLACK, OF PROVIDENCE, RHODE ISLAND.

NURSING-NIPPLE.

SPECIFICATION forming part of Letters Patent No. 649,593, dated May 15, 1900.

Application filed July 1, 1898. Serial No. 684,969. (No model.)

*To all whom it may concern:*

Be it known that I, CHARLES E. BLACK, of the city and county of Providence, in the State of Rhode Island, have invented certain new and useful Improvements in Nursing-Nipples; and I do hereby declare the following specification, taken in connection with the accompanying drawings, forming a part of the same, to be a full, clear, and exact description thereof.

With the nipple for nursing-bottles commonly employed the walls of the nipple may be pressed together by the gums of the infant, thus stopping the flow of milk, and said walls frequently adhere to each other, thus rendering the nipple useless until it is removed from the bottle and the walls separated. It is the object of the present invention to overcome these objections and provide means for holding the walls of the nipple apart and preventing said walls from adhering when pressed together by the gums of the infant. This is accomplished by inserting within the nipple a flexible core which holds the walls apart without materially affecting the flexibility of the nipple and which when the walls are pressed toward each other prevents said walls from coming into contact and stopping the flow of milk or from adhering together. The core should be made of a material which will not be acted upon by the milk and may be of any suitable construction. It is preferred, however, to make the core of wire, which may be silver or silver-plated, so that it will not be acted upon by the milk, and to so bend said wire that it forms a substantially-cylindrical or barrel-shaped spring having the convolutions of the wire extending longitudinally thereof. This form of core may be conveniently inserted in the nipples and forms an efficient means for holding the walls of the nipple apart, is readily collapsible throughout its length, and readily conforms to the form of the nipple.

Figure 1:
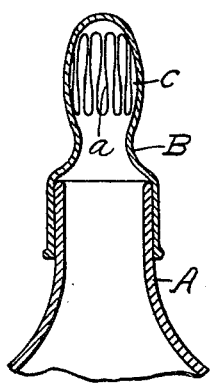
Figure 2:
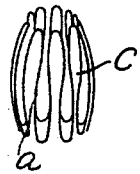
Figure 3:
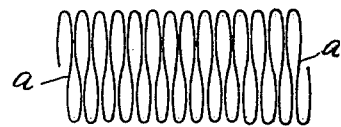

Referring to the drawings, Figure 1 is a sectional view of a nipple provided with the present invention in its preferred form. Fig. 2 is a view of the core before it is inserted in the nipple, and Fig. 3 is a view showing the manner of constructing the core.

In Fig. 1, A represents the neck of a nursing-bottle, and B a nursing-nipple of the usual shape applied thereto. Within the nipple is a flexible core C, which is also preferably resilient and tends to force the walls of the nipple outward. The core is preferably in the form of the substantially-cylindrical or barrel-shaped spring shown in Fig. 2, although it will be understood that the form of the core may be modified without departing from the invention. As shown, the core consists of a substantially-cylindrical or barrel-shaped spring formed of wire, the folds or convolutions $a$ of which extend longitudinally thereof. In forming the spring the wire is first bent into the form shown in Fig. 3, and the strip thus formed is then bent into the cylinder-like form shown in Fig. 2, and the ends of the wire are soldered together, thus forming an endless wire. In order that the spring may more nearly conform to the curves of the common form of nipple, it is preferred to curve the sides of the spring slightly, as shown, so that said spring is slightly larger in diameter at the center than at the ends, or barrel-shaped. This also facilitates the introduction of the core into the nipple.

The core may be readily inserted in the ordinary nursing-nipple and when in place prevents the walls of the nipple from coming into such close contact as to stop the flow of the milk. The core does not prevent the nipple from yielding to the pressure of the gums of the infant, but readily collapses either throughout its length or at either end under such pressure and immediately resumes its normal position when the pressure is removed. The core being formed of an endless wire, there are no points or edges to press through the rubber and injure the gums of the infant.

What I claim as my invention, and desire to secure by Letters Patent, is—

1. A nipple for a nursing-bottle having therein a substantially-cylinder-like core formed of wire, the convolutions of which extend longitudinally of said cylinder, substantially as described.

2. A core for nursing-nipples, consisting of a substantially-cylinder-like spring formed of a wire having the convolutions extending longitudinally of said spring, substantially as described.

CHARLES E. BLACK.

Witnesses:
 IRA L. FISH,
 R. A. BATES.